3,594,126
TEMPERATURE-LIMIT DETECTION
James L. Fergason, Kent, Ohio, and Newton N. Goldberg, Pittsburgh, Pa., assignors to Westinghouse Electric Corporation, Pittsburgh, Pa.
Filed Apr. 30, 1969, Ser. No. 820,602
Int. Cl. C09k *3/00;* G01k *11/12;* G01n *31/22*
U.S. Cl. 23—230LC                                  14 Claims

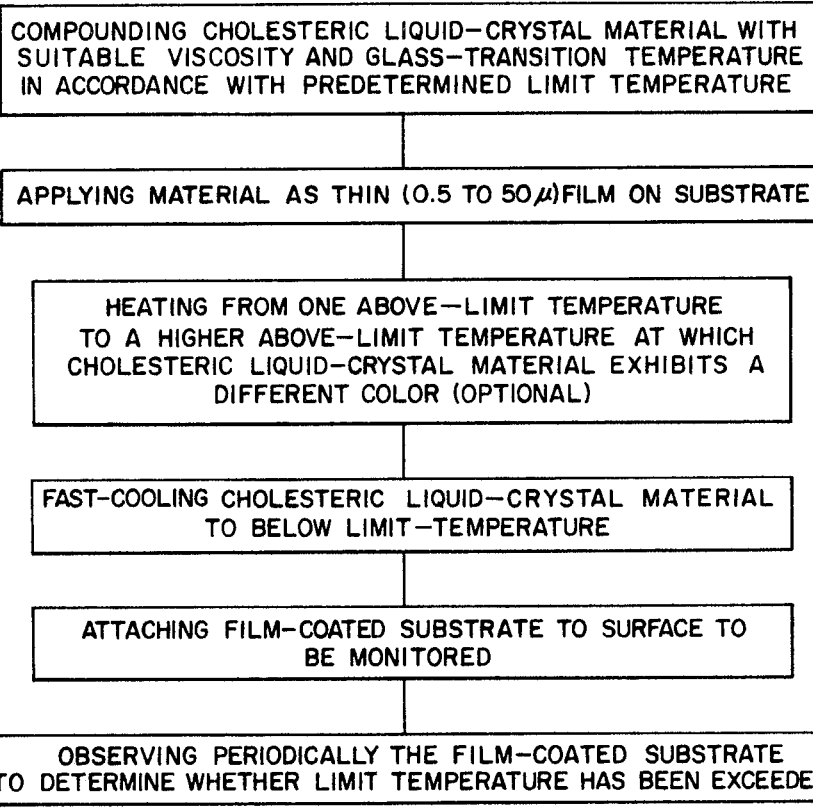
FIG. 1.
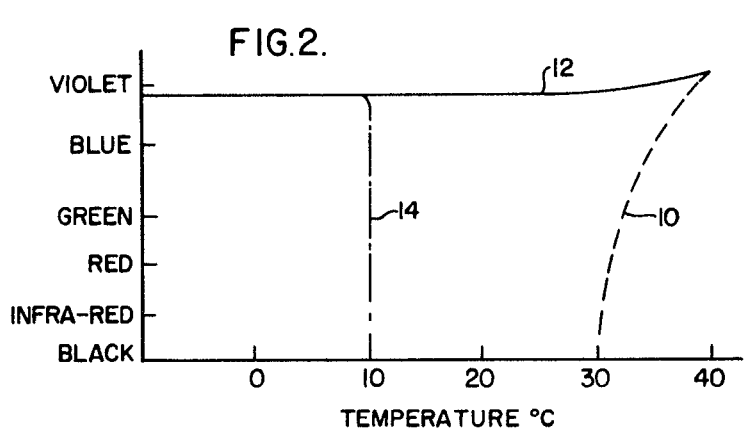
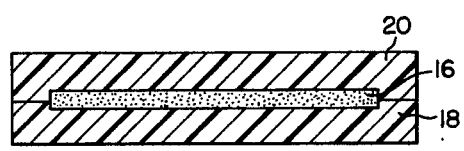
FIG. 3.
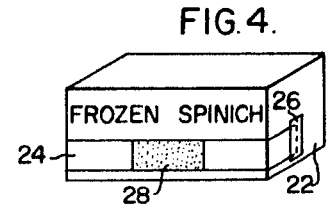
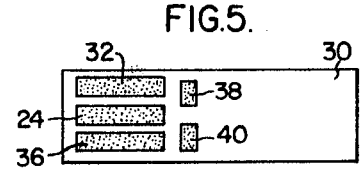
INVENTORS
James L. Fergason and
Newton N. Goldberg
BY Alex Mich Jr.
ATTORNEY

United States Patent Office 3,594,126
Patented July 20, 1971

ABSTRACT OF THE DISCLOSURE

By using certain compositions of matter comprising liquid crystal material of the cholesteric phase having a viscosity controlled in accordance with a desired limit temperature, one can obtain an irreversible color change that serves as an indication that such limit temperature has been exceeded. Possible uses include packaging of frozen foods and determination of body temperatures. Cholesteric liquid-crystal material, microencapsulated and/or in thin-film form, is fast-cooled from an above-limit temperature at which it exhibits a characteristic color other than that which it has in the vicinity of the limit temperature, retaining its high-temperature color until the limit temperature is exceeded. Particular cholesteric-phase liquid-crystal materials amenable to such method, and practices for adjusting the viscosity in accordance with desired limit temperatures, are also taught. Articles of manufacture embodying such compositions are disclosed.

BACKGROUND OF THE INVENTION

(1) Field of the invention

This invention relates to a method of temperature-limit detection or, more broadly, temperature detection, and also to compositions of matter for use in practicing such method, and to articles comprising such compositions.

(2) Description of the prior art

Many materials are known that, when subjected to temperatures within a certain range characteristic of the material, exhibit liquid crystals of the cholesteric phase. Such compositions are taught in U.S. Pat. No. 3,114,836, especially in the passage from line 61 of column 6 to line 43 of column 7, and in British Pat. No. 1,041,490, especially in the passage from line 5 to line 102 of page 4.

As mentioned in the above patents, cholesteric liquid-crystal compositions have numerous interesting properties, one of which is that these compositions have a temperature range within which they exhibit noticeable changes in color, generally as the result of relatively small changes in temperature. For the most part, these changes in color take place quite rapidly, once the composition is exposed to a new temperature.

The copending application Ser. No. 557,060, filed June 13, 1966 and issued Sept. 15, 1970 as U.S. Pat. No. 3,529,156 assigned to the assignee of this invention, discloses cholesteric liquid-crystal compositions that are hysteretic, i.e. compositions requiring about 3 to 30 minutes of exposure to a new temperature environment, before changing color.

Prior to this invention, however, it has not been known how to make a cholesteric liquid-crystal composition that would effectively indicate, even after the passage of several hours or days, that a desired limit temperature had been exceeded.

As a compound, dicholesteryl succinate is known. The prior art teaches its name, structure, method of preparation, and melting point, but it does not teach or suggest that it or other dicholesteryl esters of aliphatic $\alpha, \omega$-dicarboxylic acids may exist in metastable supercooled state wherein they exhibit a color characteristic of themselves when held indefinitely at a temperature in their color-play temperature range. Purposeful blending of such an ester, or another material that has high viscosity and is compatible with a material that exhibits a color play caused by cholesteric-phase liquid crystals, into a composition to make it capable of exhibiting such a metastable supercooled state and thus useful for temperature-limit detection, is also not taught or suggested by the prior art of which we are aware.

SUMMARY OF THE INVENTION

Temperature-limit detection is obtained by fast-cooling a cholesteric, liquid-crystal composition from an above-limit temperature to a temperature below the glass-transition temperature ($T_g$), which is the temperature at which the material will change to a mobile substance from a glassy substance. The liquid-crystal composition is compounded so that the glass-transition temperature matches the desired limit temperature, and the above-mentioned first above-limit temperature is preferably sufficiently higher than the limit temperature that the material, before the fast-cooling, has a characteristic color different from that which it will assume when the limit temperature is exceeded. The fast-cooled material retains its high-temperature color in its glassy state, unless and until the glass-transition temperature or limit temperature is exceeded, at which time it changes to a different distinctive color. This color change is effectively irreversible and serves as an indication, many hours or days afterward, that the limit temperature was exceeded. To be suitable for use in accordance with the invention, a cholesteric liquid-crystal material must be sufficiently sluggish in its color-changing action that, when fast-cooled, it retains its high-temperature color, and it must also be sufficiently stable, when exposed for a long period of time to a temperature below the glass-transition temperature, to retain its high-temperature color. One such material, useful for indicating whether frozen food has been permitted to achieve a temperature as high as 10° C., consists of about 45% oleyl cholesteryl carbonate, 45% cholesteryl monanoate, and 10% dicholesteryl sebacate, the percentages being by weight. The glass-transition temperature is manifested as a change in slope when any of the primary thermodynamic properties of a material (such as volume, heat control, index of refraction) are plotted against temperature. This change in slope falls in the same temperature range as that in which the mechanical softening point occurs. At $T_g$ the long chain molecules become free to rotate about their valence bonds. However, the molecules don't become entirely free from mutual restraint—otherwise melting would occur. Reference may be had to the section dealing with Glass Transitions beginning at page 40 of Textbook of Polymer Chemistry by F. W. Billmeyer (Interscience Publishers, Inc., New York, 1957) for a more detailed description of glass transition temperature, that description being incorporated herein by reference.

BRIEF DESCRIPTION OF THE DRAWINGS

A complete understanding of the invention may be had from the foregoing and following description thereof, taken together with the accompanying drawings, in which:

FIG. 1 is a flow diagram of a method in accordance with the present invention;
FIG. 2 is a graph used in explaining the invention;
FIG. 3 is a sectional view of a portion of an article in accordance with the invention;

FIG. 4 is a perspective view of a package provided with an article in accordance with the present invention; and FIG. 5 is a perspective view of a second article in accordance with the invention.

DESCRIPTION OF THE PREFERRED EMBODIMENTS

The first step of the method of the invention, as indicated in FIG. 1, comprises compounding a cholesteric liquid-crystal material that has a suitable viscosity and glass-transition temperature, in accordance with a predetermined limit temperature. In the case of monitoring frozen food, so as to obtain an indication of its having reached a temperature as high as 10° C., there may be used a composition consisting of, in parts by weight, about 45% oleyl chloresteryl carbonate, 45% cholesteryl nonanoate, and 10% dicholesteryl sebacate. To be somewhat more general, there are similar compositions containing about 20 to 80 weight percent each of oleyl cholesteryl carbonate and cholesteryl nonanoate that exhibit glass-transition temperatures that suit them for the purposes of the invention, and in particular, such compositions of the kind mentioned above that have a glass-transition temperature of about 0° C. to 20° C. are suitable for indicating whether or not a frozen food has been permitted to thaw.

The behavior of this material, when heated or cooled in certain ways, will be well understood from a consideration of FIG. 2. In FIG. 2, the broken line 10 indicates the color of the above-mentioned composition when slowly heated or cooled to the various temperatures indicated. As will be seen, the composition is black or red at about 30° C., and when subjected to higher temperatures, it exhibits colors closer to the violet end of the visible spectrum. If heated to and held at about 40° for a sufficient length of time, it becomes violet. The solid line 12 indicates the effect of fast-cooling. It will be seen fast-cooling to a temperature of about 0° C. or lower yields a composition that remains blue or violet. The dash-dot line 14 indicates the color changes that occur when the fast-cooled composition is heated to about 10° C., which is the glass-transition temperature of this composition. The composition turns green, then red, and then black.

Throughout this application, the references to the colors exhibited by cholesteric-phase liquid-crystal materials will be understood to indicate the color seen when the material is viewed against a black background. Those familiar with cholesteric-phase color-play phenomena will understand that a different color is seen if the background is clear. When the background is black, the color that is seen is characteristic of light of that wavelength or those wavelengths that are being absorbed or reflected by the cholesteric, phase material. Light of the wavelength that the cholesteric-phase material will transmit is transmitted to the black background and absorbed there. When there is a clear or white background, or none is used, the same cholesteric-phase material at the same temperature exhibits a color that is the complement of the color seen against a black background. Material that appears red against a black background appears green against a white background. The manner of applying a black background to, for example, a plastic film is a matter of choice. Gold black or finely divided nickel may be used, as taught in column 3 of U.S. Pat. No. 3,114,836. Other possibilities include using a polyvinyl alcohol solution or an acrylic lacquer containing a black dye, a black paint, or carbon black.

The invention is not limited to the use of the particular composition mentioned above for the detecting of thawing in frozen foods or for similar uses. The same ingredients mentioned above may be used in somewhat different proportions, alone or with other substances known to raise the glass-transition temperature of cholesteric liquid-crystal compositions.

The dicholesteryl esters of dicarboxylic acids, such as dicholesteryl sebacate (used above) or dicholesteryl malonate, cause increases in viscosity of the liquid-crystal composition, so that these are used in greater amounts whenever a higher limit temperature is desired. Somewhat more generally, the dicholesteryl esters of unsaturated and saturated α,ω-dicarboxylic acids containing 1 to 27 carbon atoms may be used.

Another particularly effective viscosity increasing agent is para-nonylphenyl cholesteryl carbonate, which at room temperature is an extremely viscous non-crystallizing liquid; though it does not itself exhibit a color play, it will control the viscosity and the tendency to crystallize to any material to which it is added. It may be used in effective amounts up to 40%. The compound is disclosed and claimed in application Ser. No. 820,659, filed Apr. 30, 1969 and assigned to the assignee of this invention. Except in unusual circumstances, it will be necessary to use a dicarboxylic acid ester or phenyl cholesteryl carbonate in effective amounts up to about 40%.

The dicholesteryl esters of such acids as malonic, glutaric, adipic, pimelic, and sebacic, i.e., the aliphatic α,ω-dicarboxylic acids containing up to about 27 carbon atoms, are themselves novel compounds, except for the oxalate and succinate. As compositions, these dicholesteryl diesters, including the oxalate and succinate, are novel when they are in a supercooled, metastable state in which they exhibit a color characteristic of the same material at a temperature within its color-play temperature range despite being at a substantially cooler temperature. Moreover, cholesteric-phase liquid-crystal compositions that incorporate such compounds in an effective amount, to display this effect of a colored, supercooled metastable state are also novel.

The dicholesteryl esters of dicarboxylic acids that, when in a colored supercooled metastable state, comprise novel compositions of matter having the formula:

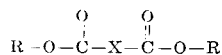

where R is the cholesteryl radical $C_{27}H_{45}$, or more specifically,

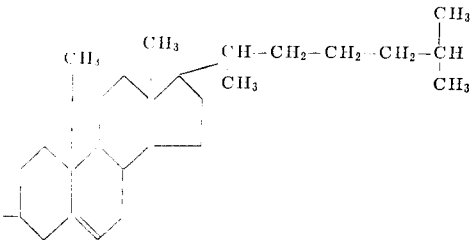

and X is

where $n$ is an integer from 0 to 25. The succinate is of this formula, with $n$ being 2; and the sebacate is of this formula, with $n$ being 8. The case where $n$ is 0 is the oxalate. There are, moreover, the novel dicholesteryl esters of unsaturated dicarboxylic acids, such as maleic, fumaric, citraconic and mesaconic acids. These are of the general formula given above, but with —X— replaced with an unsaturated bivalent radical, such as

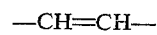

in the case of maleic and fumaric and

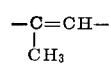

in the case of citraconic and mesaconic acids. These unsaturated acids exhibit cis-trans isomerism, with the trans isomer generally being the higher melting of the two. These unsaturated diesters tend to be less viscous at a given temperature than the corresponding saturated diester. In general, diesters containing greater numbers of carbon atoms tend to be higher-melting and to be more viscous at a given temperature in the liquid state.

The novel dicholesteryl esters are prepared conveniently by the reaction of cholesterol with the corresponding diacyl chloride, which may be obtained by chlorination of the corresponding diacid, using such reagents as $PCl_3$, $PCl_5$, or $SOCl_2$. The cholesterol is dissolved in a suitable organic solvent such as benzene, and the reaction is driven by using molar quantities of a proton acceptor such as triethylamine or pyridine. Hydrogen chloride is given off by the reaction of cholesterol and the acyl chloride, and the proton acceptor drives the reaction by taking up this hydrogen chloride to form an insoluble tertiary-amine hydrochloride.

The preparation of dicholesteryl sebacate, a novel compound, is illustrated by the following example:

EXAMPLE

Sebacyl chloride (0.25 mol, 59.8 g.) is dissolved in 350 milliliters of benzene. Cholesterol (0.50 mol, 193.3 g.) and pyridine (0.50 mol, 39.8 g.) are dissolved in 600 milliliters of benzene. One of the aliquots is slowly added to the other. When the addition is complete the mixture is mildly warmed for one hour, during which time a reaction proceeds with the formation of pyridine hydrochloride, which is insoluble. The reaction mixture is cooled to room temperature and filtered. To the filtrate, there is then added methanol (about 700 milliliters) to cause precipitation of the ester, dicholesteryl sebacate, which is not soluble in the benzene-alcohol mixture. The mixture is filtered to recover the ester as precipitate. The ester so recovered is further purified by recrystallization. This is done by dissolving it in benzene and again adding methanol to generate a precipitate, which is recovered by filtration and dried to form the product. The ester has a melting point of about 160° C. The yield, based on the quantity of cholesterol charged, is about 85%.

The adipate and the succinate are prepared similarly, using adipyl chloride or succinyl chloride in place of sebacyl chloride. The adipate melts at about 190° C. to 220° C. and the succinate at 220° C. to 247° C. The yield is about the same in each case.

All three of these dicholesteryl esters exhibit color-play temperature ranges indicative of their having, at such temperatures, a cholesteric-phase liquid-crystal structure. Moreover, each of these three esters has been found amenable to a practice in which the ester is dissolved in benzene, applied to a polyethylene terephthalate film as a thin film about 5 to 50 microns thick, heated to a temperature at which it exhibits a color-play, and then permitted to air cool to room temperature with the color-play color persisting not only through the cooling but, if the film-coated film is stored at about 0° C. or below, for an indefinite period thereafter (at least one month).

Cholesteric liquid-crystal compositions in accordance with the invention are not limited to compositions based upon oleyl cholesteryl carbonate and cholesteryl nonanoate. Indeed, depending upon the desired limit temperature, appropriate ones or mixtures of the various compounds mentioned in British Pat. No. 1,041,490, lines 5 to 47 of page 4, may be used.

It is in general true that compounds having long-chain substituents exhibit their color play at a higher temperature than similar compounds with shorter-chain substituents. It is also generally true that compounds with olefinically or acetylenically unsaturated substituents exhibit their color play at lower temperatures than the corresponding compounds with saturated substituents, and that compounds having aromatic substituents tend to exhibit their color play at substantially higher temperatures. Mixtures or blends of different materials, each of which is known to exhibit a cholesteric liquid-crystal phase within a particular temperature range, tend themselves to have a characteristic range intermediate those of the ingredients composing them. Within the above guide lines, those skilled in the art will in most instances find it relatively simple to arrive at, after a minimum of experimentation, a cholesteric liquid-crystal composition of suitable characteristics for the intended use.

Referring again to FIG. 1, the next step is to apply the above material as a thin film, e.g., 0.5 to 50 microns in thickness, on a suitable substrate. Although almost any material may serve as the substrate, certain materials suggest themselves as especially suitable, and among these are such flexible materials as polytetrafluoroethylene or polyethylene terephthalate sheet or film, polymethyl methacrylate sheet or film, cellophane, wax paper, and aluminum foil. Such a film is obtained by dissolving the material in a suitable organic solvent such as benzene and painting or otherwise applying it to the substrate, with the organic solvent being permitted to evaporate. Though in most instances it will be most convenient to use the material in the form of a thin film, the practice of microencapsulating the material and then applying a layer of the micro-capsules to the substrate is also feasible.

The next step, which is indicated, as optional, comprises heating from one above-limit temperature to a higher-above limit temperature at which the cholesteric liquid-crystal material exhibits the different color. This step may not be necessary, provided that the ambient temperature at which the cholesteric liquid-crystal material exists is already high enough that it has a color distinguishable from that which the material exhibits when held for a long time at about the limit temperature or slightly above. In the case of the particular composition mentioned above based upon oleyl cholesteryl carbonate, cholesteryl nonanoate and dicholesteryl sebacate, such a heating step is necessary, provided that the material is at about 25° C. when applied to the substrate. That composition turns from black to red when raised to 30° C. and then becomes blue when heated further to 40° C., and with it, it is essential that the material, before being fast-cooled as discussed hereinbelow, be given a color other than the black or red that it characteristically exhibits at temperatures up to about 30° C. The heating may be done in any suitable way. With materials that require this heating step, it is generally satisfactory to heat the material to a temperature within about the upper one-third of the temperature range within which the material exhibits a color play.

Referring to FIG. 3, which shows a layer 16 of suitable cholesteric liquid-crystal materials sandwiched between layers 18, 20 of suitable substrate material, such as polytetrafluoroethylene, it will be seen that since the liquid-crystal material is so protected, the heating may conveniently be done by immersing the strip material in warm water.

The next step is the fast-cooling step. This may be done by immersing a strip of material as indicated in FIG. 3 in brine, or by packing it in Dry Ice, or in any other suitable way. For reasons of economy, it is generally desirable to use thin films of liquid-crystal material, and these are quite easy to cool rapidly. The necessary rapidity of the cooling step will vary, depending upon the exact nature of the composition employed, but in most instances, a rate of 10° C. per minute or higher will prove satisfactory. As will be understood, the cooling must take place at a rate fast enough that a color is retained that is distinguishable from the characteristic limit-temperature color of the material.

Referring now to FIG. 4, there is shown a package 22 of frozen food, to which a strip 24 of material has been fastened, as at 26, the strip 26 having an area 28 containing cholesteric liquid-crystal material in accordance with the invention. If desired, the material 28 may, of course, be applied directly to the wrapping for the package 22.

Referring to FIG. 5, there is shown a strip 30 of plastic or the like, to which there has been applied in areas 32, 34, 36, 38, 40 different appropriate supercooled cholesteric liquid-crystal materials, each having an appropriate viscosity and glass-transition temperature to suit it to display an irreversible color change at a predetermined limit temperature. If, for example, the area 32 has a limit temperature of 98° F., and the areas 34, 36, 38 and 40 have limit temperatures of 99° F., 100° F., 102° F. and 104° F., respectively, with the areas 32 through 40 being covered suitably by plastic as indicated in FIG. 3, there is thus made a device that may conveniently be used for the determination of human body temperature. It is used by being inserted in the mouth of a patient, and has the advantage, in comparison with the conventional mercury thermometer, of itself providing a permanent record of the temperature of a patient.

Numerous other uses will suggest themselves to those skilled in the art.

While we have shown and described herein certain embodiments of our invention, we intend to cover as well any change or modification therein which may be made without departing from its spirit and scope.

We claim:

1. A composition of matter useful for indicating whether a predetermined limit temperature has been exceeded, said composition of matter consisting essentially of a liquid-crystal material in the cholesteric phase containing an effective amount up to 40% by weight of a viscosity-increasing agent selected from the group consisting of the dicholesteryl esters of saturated and unsaturated dicarboxylic acids containing 1 to 27 carbon atoms and para-nonylphenyl cholesteryl carbonate, said composition being capable of exhibiting a color play in the temperature range above said limit temperature and having a glass-transition temperature substantially equal to said limit temperature, said composition being in a supercooled state wherein it exhibits a color characteristic of said composition at a temperature higher than said limit temperature.

2. A composition as defined in claim 1, characterized in that said liquid-crystal material in the cholesteric phase comprises about 20% to 80% by weight each of oleyl cholesteryl carbonate and cholesteryl nonanoate and exhibits a glass-transition temperature of about 0° C. to 20° C.

3. A composition as defined in claim 2, characterized in that said composition comprises about 45% by weight each of oleyl cholesteryl carbonate and cholesteryl nonanoate and about 10% by weight of dicholesteryl sebacate, said material having a glass-transition temperature of about 10° C. and having been supercooled from a temperature of about 38° C. to 40° C. whereby said composition exhibits a blue color in the supercooled condition.

4. A method for obtaining an indication of whether a predetermined limit temperature has been exceeded, said method comprising providing a composition of matter capable of forming liquid crystals of the cholesteric phase exhibiting a play of colors within a range of temperatures above said limit temperature and having a glass-transition temperature substantially equal to said limit temperature; fast-cooling said composition of matter to below said limit temperature from a temperature at which said composition of matter exhibits a color substantially different from that characteristically exhibited by said composition of matter at said limit temperature to produce a cholesteric liquid-crystal material in the supercooled state that retains a color that is characteristic of a temperature greater than said limit temperature; and placing said material in a supercooled state in a location whose temperature is to be monitored.

5. A method as defined in claim 4, characterized in that said composition of matter is characterized in that before being placed in said environment, said composition of matter is applied to a suitable substrate in the form of a film having a thickness of about 0.5 to 50 microns.

6. A method as defined in claim 4, characterized in that before being fast-cooled to produce said material in a supercooled state, said composition of matter is heated to a temperature within about the upper one-third of said temperature range within which said material exhibits a color play, said material then being fast-cooled from said temperature so as to retain in its supercooled state substantially the characteristic color which it exhibits at said temperature.

7. A method according to claim 4 for obtaining an indication of whether a limit temperature of about 0° C. to 10° C. has been exceeded, said method being characterized in that said composition of matter comprises about 20% to 80% by weight each of oleyl cholesteryl carbonate and cholesteryl nonanoate and in effective amounts up to 40% by weight of a viscosity-increasing agent selected from the group consisting of the dicholesteryl esters of unsaturated and saturated dicarboxylic acids containing from 1 to 27 carbon atoms and para-nonylphenyl cholesteryl carbonate, said composition of matter having a glass-transition temperature of about 0° C. to 10° C.

8. A method as defined in claim 7, characterized in that said composition of matter comprises about 45 weight percent of oleyl cholesteyl carbonate, 45 weight percent of cholesteryl nonanoate, and 10 weight percent of dicholesteryl sebacate.

9. An article of manufacture useful for indicating whether a predetermined limit temperature has been exceeded, said article comprising a material according to claim 1 in the form of a film having a thickness of about 0.5 to 50 microns in contact with a substrate of flexible material.

10. A thermometric article comprising an article according to claim 9, further characterized in that said article comprises a plurality of bodies of cholesteric liquid-crystal material in a supercooled state according to claim 1, different ones of said bodies of material having compositions which exhibit different predetermined glass-transition temperatures, whereby a permanent record of the maximum temperature to which said article is exposed in use may be obtained.

11. As a novel composition of matter, a material consisting essentially of a material capable of exhibiting cholesteric-phase liquid-crystals, said material being at a temperature below its glass-transition temperature and in a supercooled metastable state in which it exhibits a color characteristic of said material at a temperature above its glass-transition temperature and within its color-play temperature range, said material consisting essentially of at least one dicholesteryl ester of an $\alpha,\omega$-dibasic carboxylic acid containing up to about 27 carbon atoms.

12. A composition as defined in claim 11, characterized in that said material is composed of at least one such dicholesteryl ester.

13. A composition as defined in claim 11 characterized in that said dicholesteryl ester is of a saturated aliphatic $\alpha,\omega$-dibasic carboxylic acid containing up to about 27 carbon atoms.

14. A composition as defined in claim 13, characterized in that said dicholesteryl ester is dicholesteryl sebacate.

References Cited

Kaufmann et al., Chem. Abstr. 58, 12786 d, e, June 1963.

MORRIS O. WOLK, Primary Examiner

R. M. REESE, Assistant Examiner

U.S. Cl. X.R.

23—253TP; 73—356; 99—192TT; 116—114.5; 250—83; 252—408; 351—60